Nov. 16, 1965  R. W. BUNTENBACH  3,218,623
3 PLATE PROXIMITY SCORER
Filed April 19, 1961  2 Sheets-Sheet 1
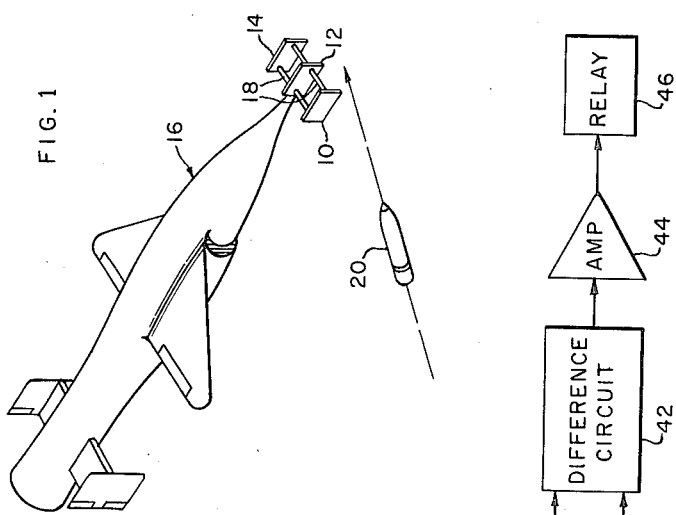
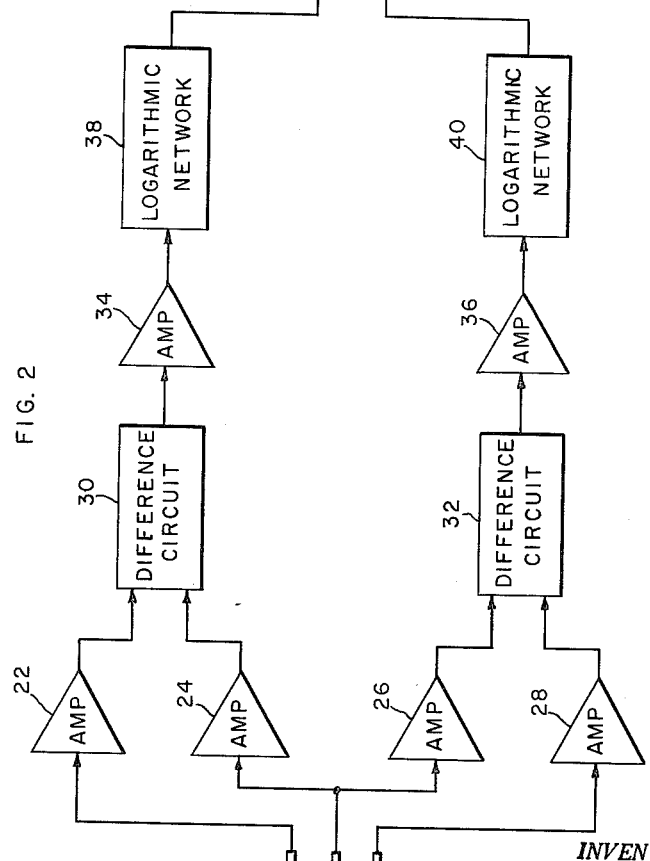
INVENTOR.
RUDOLPH W. BUNTENBACH
BY

United States Patent Office 3,218,623
Patented Nov. 16, 1965

3,218,623
3 PLATE PROXIMITY SCORER
Rudolph W. Buntenbach, San Francisco, Calif., assignor to General Precision, Inc., a corporation of Delaware
Filed Apr. 19, 1961, Ser. No. 104,075
8 Claims. (Cl. 340—258)

This invention relates to novel and improved apparatus for detecting the presence of electrostatic charges, and more particularly to a novel and improved apparatus for detecting the presence of an electrostatically charged body within a pre-determined range irrespective of the magnitude of the electrostatic charge appearing on the charged body.

Briefly described, the electrostatic charge detection apparatus embodying this invention includes, in its basic concept, three substantially parallel and equally spaced electrically conductive detector plates and associated electronic circuitry designed to provide an output signal that is related only to the distance between the detector plates and the electrostatically charged body. If the detecting apparatus is mounted in an aerial gunnery target for use as a proximity scoring device, an electrostatically charged body, such as the projectile or a missile that has accumulated its electrostatic charge by its flight through the medium of atmosphere, passing near the electrically conductive plates will induce on each plate an electrostatic charge the magnitude of which is related to the distance between the electrostatically charged body and that plate. The charge induced on the plates causes a potential unbalance between the plates that is detected by the electronic circuitry which operates on the potential differences between the center or common detector plate and each of the outer detector plates to produce an output indication that is related only to the distance to the electrostatically charged body.

It is clearly established fact that a metallic or non-metallic, conducting or non-conducting body traversing a medium such as the atmosphere develops an electrostatic charge density. Such a charged body induces upon another body or bodies in its proximity a charge of opposite sign and of a magnitude depending upon certain factors, such as a dielectric constant of the medium, magnitude of the electrostatic charge on the charged body, and the spacing or the distance between the charged body and the other body or bodies. This principle can be used to detect the presence of an electrostatically charged body such as a missile or projectile fired at a target drone equipped with the detection device.

My invention contemplates the use of at least three detector electrodes or plates that are preferably parallel, equal in size and equally spaced. While it is to be understood that the three detector electrodes may assume various forms such as tubular elements or other structural shapes, and although the center or common detector electrode may assume various forms such as tubular elements or other structural shapes or may be a portion of the body or fuselage of an aerial target or target drone in which the detector system may be installed, the detector elements will henceforth be called detector plates. Coupled to each of the three detector plates is electronic circuitry that will detect any potential unbalance that is produced between the center or common detector plate and each of the outer two detector plates. The circuitry will operate on the unbalanced potential detected between the common plate and the two detector plates to produce an output signal proportional only to the distance to the electrostatically charged body and independent of the dielectric of the medium or the magnitude of the charge on the electrostatically charged body which need have only sufficient charge on it to produce a detectable potential difference between the detector plates.

Local charges that may be induced on the conductive detector plates by the drones own passage through the medium of atmosphere will charge each of the three detector plates equally. Since there would therefore be no charge differences between any of the three detector plates, the system would remain in balance and the electronic circuitry coupled to each of the three detector plates would sense no charge potential and would give no indication of presence of an electrostatic charge.

Other electrostatic charge detection devices incorporate the feature of being capable of detecting an electrostatic charge irrespective of local charges but are incapable of producing an indication of proximity of an electrostatically charged body irrespective of the magnitude of charge on the body and the dielectric constant of the medium between the body and the detection system. These detectors will indicate that an electrostatically charged body is in the area; however, since their response is largely dependent upon the magnitude of the charge carried by the electrostatically charged body and since this charge magnitude will vary greatly with varying atmospheric conditions and velocity of the body, the charge detectors cannot be adapted to give an indication of distance between the detector and the electrostatically charged body nor can they accurately indicate if the charged body is within a certain predetermined range of the detection system. The novelty of the present invention is its ability, not only to detect the presence of an electrostatically charged body, but to provide means for determining proximity within a predetermined distance from the detector irrespective of the magnitude of the electrostatic charge carried by the body and of the dielectric constant of the medium.

When an electrostatically charged body, such as a missile or projectile, approaches the detector plates of the proximity scoring device, the charged body will induce a larger charge on the detector plate nearest the electrostatically charged body, the center or common detector plate will have induced upon it a slightly less charge, and the detector plate farthest from the electrostatically charged body will have induced upon it a charge of still lower magnitude. The voltage induced on any detector plate may be represented by the equation:

$$V = \frac{Q}{4\pi e R} \qquad \text{Eq. (1)}$$

Where

Q is the charge on the electrostatically charged body,
$e$ is the dielectric constant of the medium between the electrostatically charged body and the detector plate,
R is the distance between the electrostatically charged body and the detector plate.

In the present invention the electronic circuitry will detect the voltage induced upon each detector plate and will compare the voltages from the outer detector plates with the voltage induced on the center or common detector plate. The potential difference between the voltage induced on an outer detector plate and the common plate may be expressed by the following:

$$V_1 - V_0 = \frac{Qd}{4\pi e}\left(\frac{1}{R_1} - \frac{1}{R_0}\right) \qquad \text{Eq. (2)}$$
$$= \frac{Qd}{4\pi e}\left(\frac{R_0 - R_1}{R_1 R_0}\right)$$

Where $V_1$ is the voltage induced on one of the outer detector plates,
$V_0$ is the voltage induced on the center or common detector plate, $d$ is the spacing between the two detector plates,
$R_1$ is the distance between the electrostatically charged body and the outer detector plate, and
$R_0$ is the distance between the electrostatically charged body and the center or common detector plate.

Equation 2 represents a potential difference between one of the outer detector plates, which has been arbitrarily designated as 1, and the center or common detector plate, which has arbitrarily been designated as 0. The electronic circuitry also takes the difference between the center or common detector plate and the other outer detector plate. This may be represented as:

$$V_2 - V_0 = \frac{Qd}{4\pi e}\left(\frac{R_0 - R_2}{R_2 R_0}\right) \qquad \text{Eq. (3)}$$

Where $V_2$ is the voltage induced on the outer detector plate, arbitrarily designated as 2, and
$R_2$ is the distance between the electrostatically charged body and this outer detector plate.

It has been stated that the novelty of this invention lies in its ability to provide an indication of the proximity of an electrostatically charged body irrespective of the dielectric constant of the medium and of the magnitude of charge on the electrostatically charged body. This may be accomplished by dividing the value of $V_1 - V_0$ in Equation 2 by the value of $V_2 - V_0$ of Equation 3. If the detector plate array has been constructed so that spacing between the plates is equal, then the values of $d$, $Q$ and $e$ will be identical in both Equation 2 and Equation 3 and a division of Equation 2 by Equation 3 will produce:

$$V\text{ out} = \frac{V_1 - V_0}{V_2 - V_0} = \left(\frac{R_0 - R_1}{R_0 - R_2}\right)\left(\frac{R_2 R_0}{R_1 R_0}\right) \qquad \text{Eq. (4)}$$

If the values of $R_0$, $R_1$ and $R_2$ are large with respect to the spacing between the detector plates, negligible error will be introduced if it is assumed that $R_0 - R_1 = R_0 - R_2$. Therefore, Equation 4 will become:

$$V\text{ out} = \frac{R_2}{R_1} \qquad \text{Eq. (5)}$$

It can be seen that $R_2$ is related to $R_1$. If the electrostatically charged body is on an axis normal to the surface of the three detector plates, then the distance $R_2$ is equal to the distance $R_1$ plus the spacing between detector plate 1 and detector plate 2. Equation 5 then becomes:

$$V\text{ out} = \frac{R_1 + 2d}{R_1} \qquad \text{Eq. (6)}$$
$$= 1 + \frac{2d}{R_1}$$

If the electrostatically charged body is displaced at an angle $\theta$ from the axis normal to the surface of the three detector plates, Equation 6 becomes:

$$V\text{ out} = 1 + \frac{2d}{R_1}\cos\theta \qquad \text{Eq. (7)}$$

The electronic circuitry performs the above division operations by applying the values of the different voltages of Equations 2 and 3 to logarithmic networks and then extracting the difference in a difference amplifier. The output of the difference amplifier may then be used to excite a relay or suitable indicating device that will provide an indication only when an electrostatically charged body has penetrated within preselected distance in the entire field of detection.

One object of this invention is to provide detecting apparatus for sensing the presence of an electrostatically charged body.

Another object of this invention is to provide an electrostatic charge detector for the purpose of detecting the presence of a projectile or missile within a predetermined distance of a body carrrying the detector.

Another object of this invention is to provide an electrostatic charge detector that will indicate the presence of an electrostatically charged body irrespective of the magnitude of charge appearing on that body.

Other objects and advantages of this invention will become apparent when taken in connection with the accompanying claims and drawings in which:

FIGURE 1 shows a perspective view of an electrostatic charge detector plate embodying this invention, mounted on a target drone;

FIGURE 2 is a block diagram of the detector plates and associated electronic circuitry embodying this invention and;

Figure 3:
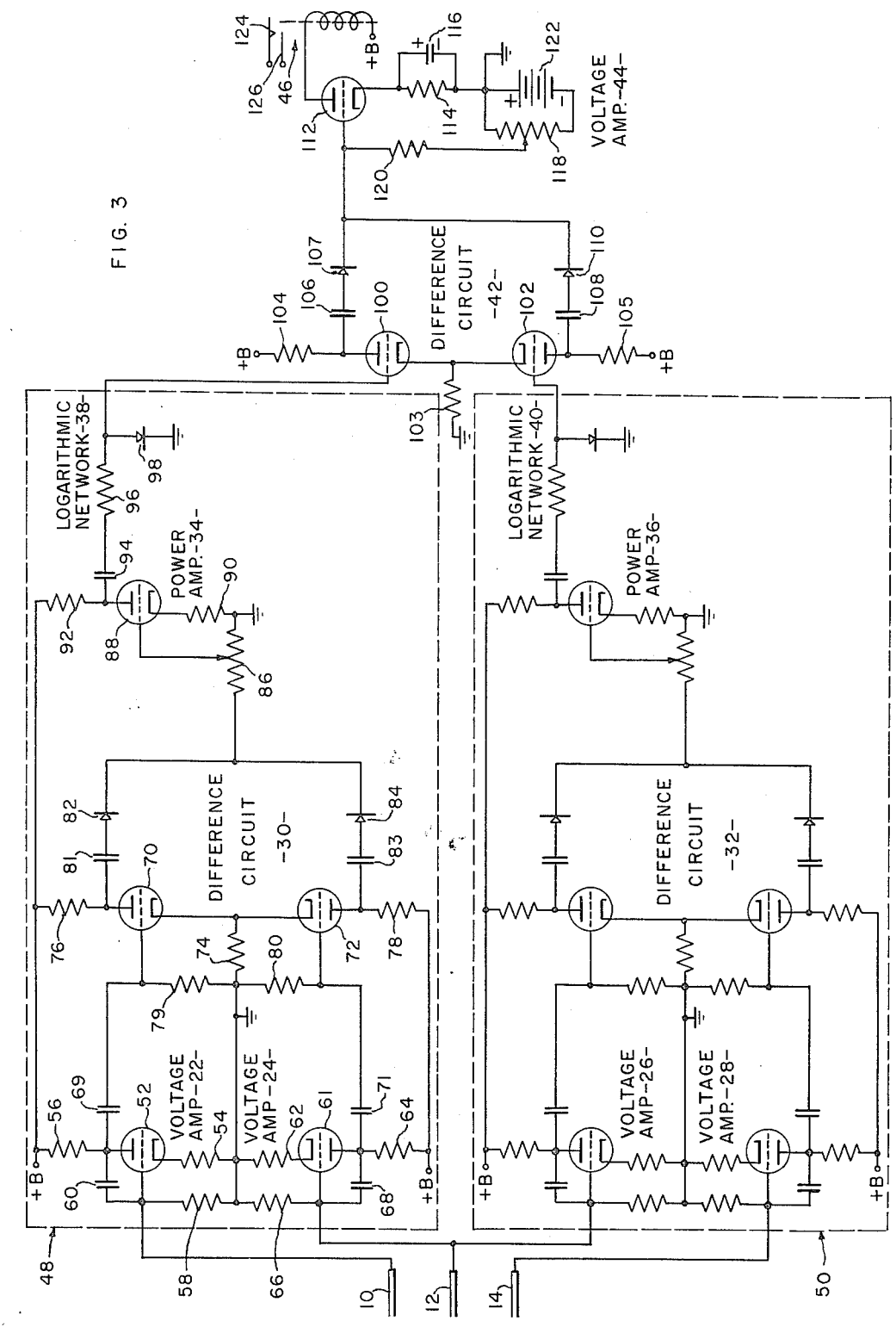
FIGURE 3 is a schematic circuit diagram of circuitry embodying this invention which may be used to provide an indication of proximity of an electrostatically charged body.

In the embodiment of the invention shown in FIGURE 1, three electrically conductive plates 10, 12 and 14 are shown located on the nose of a target drone 16. Detector plates 10, 12 and 14 are mounted so that they are substantially parallel and are arranged so that the spacing between detector plates 10 and 12 is substantially equal to the spacing between the detector plates 12 and 14. The substantially equal spacing between detector plates 10, 12 and 14 may be achieved by mounting the center detector plates 12 to the nose section of target drone 16 and then coupling detector plates 10 and 14 to center detector plate 12 by insulating spars 18 which will provide electrical insulation between the three detector plates and will also provide mechanical stability.

When an electrically charged body such as a projectile 20 comes within a pre-selected range of target drone 16, a portion of the electrostatic charge accumulated on body 20 by its passage through atmosphere will be induced upon each of the detector plates 10, 12 and 14. The charge induced will be opposite in sign to the electrostatic charge appearing on the body 20 and the magnitude of the charge induced on detector plates 10, 12 and 14 will depend upon a number of certain factors, such as magnitude of the charge on body 20, dielectric constant of the medium through which the charge is induced, distance between body 20 and each of the detector plates 10, 12 and 14 and the angle of approach of body 20 with respect to the axis of the target drone 16. When body 20 approaches the target drone 16 from one side as shown in FIGURE 1, a charge of greater magnitude will be induced on the detector plate closest to the electrostatically charged body 20. In FIGURE 1, detector plate 10, which is the closest detector plate to body 20 will have induced upon it a greater charge than that which will be induced on detector plates 12 and 14. Similarly, detector plate 14, which is at a greater distance from body 20 than detector plate 12, will have induced upon it a charge of lower magnitude than that induced upon detector plate 12.

Amplifier 22, shown in FIGURE 2, will detect and amplify the electrostatic charge that has been induced upon detector plate 10 and amplifier 24 will detect and amplify the charge that has been induced upon detector plate 12 by the proximity of an electrostatically charged body. Similarly, amplifier 26 will detect and amplify the charge induced upon detector plate 12 and amplifier 28 will detect and amplify the charge induced upon detector plate 14. The operation on these detected voltages then proceeds in accordance with Equations 2 and 3: the amplified signal from detector plate 12 is subtracted from the amplified signal of detector plate 10 by applying the output of amplifiers 22 and 24 to a difference circuit 30. Similarly, the output of amplifiers 26 and 28 is applied to a difference circuit 32 in order to obtain their difference.

Difference circuit 30 is coupled to power amplifier 34 and difference circuit 32 is coupled to an identical power amplifier 36. The outputs of amplifiers 34 and 36 respectively coupled to logarithmic networks 38 and 40 in order to prepare the signals for the division operation in accordance with Equation 4. The division of Equation 4 is accomplished by extracting the difference of the logarithms of the two voltage values by applying the outputs of logarithmic networks 38 and 40 to a difference circuit 42. The output of the difference circuit 42 is proportional to the logarithm of the ratio $R_2/R_1$ as derived in Equation 5. This value may, if desired, be introduced to a non-linear amplifier in order to obtain its antilog; however, a negligible error is introduced if this value appearing at the output of difference circuit 42 is introduced into a voltage amplifier 44 and thence to a relay or other indicating device 46. Relay or indicating device 46 may then be coupled to a telemetering transmitter, if desired, in order to signal that an electrostatically charged body has approached within the detection range of the proximity scorer.

FIGURE 3 is a schematic diagram of circuitry that may be used to detect the presence of an electrostatically charged body. Detector plates 10, 12 and 14 are coupled to two identical channels generally shown in FIGURE 3 by numerals 48 and 50. Each of these identical channels 48 and 50, contain voltage amplifiers, a difference amplifier, a power amplifier and logarithmic network. The outputs of the two identical channels 48 and 50 are then coupled to a difference amplifier 42 the output of which is amplified by voltage amplifier 44 which excites relay 46.

Detector plate 10 is coupled to the control grid of vacuum tube 52 which may be one section of a type 6SU7 twin-triode vacuum tube. The cathode of tube 52 may be connected to ground through resistance 54 which may have a value of 1500 ohms, and the anode of vacuum tube 52 may be coupled through resistance 56 to a +B voltage which may be 135 volts. Since the voltage induced on the detector plates by the presence of an electrostatically charged body is of a very low magnitude, it is necessary that the input resistance of each amplifier be very high; therefore the control grid of vacuum tube 52 should be coupled to ground through a very high resistance 58 which may have a value of 100 megohms. It may also be desirable to add a small capacitance 60 between the anode and the control grid of tube 52 in order to increase the effective time constant of the circuit.

The center detector plate 12 is coupled to the control grid of an identical amplifying tube 61 which may have its cathode connected to ground through resistance 62 which may have a value of 1500 ohms and its anode connected to +B through a resistance 64 which may have a value of 150K ohms. The control grid of vacuum tube 61 may be connected to ground through a very high resistance 66 which may have a value of 100 megohms and the control grid may be coupled to the anode through a small capacitance 68 which provides feedback to increase the effective time constant of the circuitry.

The output of voltage amplifier 22 is taken from the anode of vacuum tube 52 and is coupled through coupling capacitor 69, which may have a value of 1.0 microfarad, to the control grid of vacuum tube 70 which may be one section of a type 6SU7 twin triode vacuum tube. Similarly, the anode of vacuum tube 61 is coupled through an identical coupling capacitor 71 to the control grid of vacuum tube 72 which may be the other section of the type 6SU7 dual triode vacuum tube. The cathodes of tubes 70 and 72 are coupled together and thence to ground through a common cathode resistance 74 which may have a value of 100K ohms, and the anodes of vacuum tubes 70 and 72 may be coupled to +B through resistances 76 and 78, respectively, each of which have a value of 50K ohms. The control grids of vacuum tubes 70 and 72 may each be coupled to ground through grid resistors 79 and 80, respectively, each of which may have a value of 20 megohms. The voltage now appearing on the anode of vacuum tube 70 is the difference of the amplified voltage appearing on detector plate 10 less the voltage appearing on detector plate 12. Similarly, the voltage appearing on the anode of vacuum tube 72 would be the difference of the amplified voltage appearing on the detector plate 12 less the voltage appearing on the detector plate 10.

The anode of vacuum tube 70 is coupled through a coupling capacitor 81 and a diode 82 to one terminal of balance potentiometer 86, which may have a value of 1.0 megohm. Similarly, the anode of vacuum tube 72 is coupled through a coupling capacitor 83 and a diode 84 to the same terminal of balance potentiometer 86. The signal voltage appearing at this terminal of balance potentiometer 86 is proportional to difference in voltages induced on detector plates 10 and 12 irrespective of which of detector plates 10 and 12 are at a higher potential.

Balance potentiometer 86 and the identical balance potentiometer in identical channel 50 are utilized as gain controls and should be adjusted so that the outputs of identical channels 48 and 50 are equal when equal signals are being received by, and no potential difference exists between, detector plates 10, 12 and 14.

The opposite terminal of balance potentiometer 86 is connected to ground, and the variable arm of balance potentiometer 86 is coupled directly to the control grid of the power amplifier vacuum tube 88 which may be one section of a type 5687 twin-triode vacuum tube. The cathode of vacuum tube 88 is coupled to ground through a resistance 90 which may have a value of 200 ohms, and the anode of vacuum tube 88 is connected to +B through a resistance 92 which may have a value of 10K ohms. The anode of vacuum tube 88 is coupled through a coupling condenser 94, which may have a value of 1.0 microfarad, to a resistance 96, which may have a value of 10K ohms. The opposite terminal of resistance terminal 96 is connected to a logarithmic device such as a type IN54A diode. Resistance 96 and logarithmic device 98 form a variable voltage device which is the logarithmic network 38 shown in FIGURE 2. Since the effective resistance of a diode such as that used for logarithmic device 98 varies logarithmically with relatively low voltages impressed across it, the output voltage taken across logarithmic device 98 is proportional to the logarithm of the voltage impressed across the logarithmic network 38. The voltage appearing across the logarithmic device 98 is therefore proportional to the logarithm of the voltage appearing on detector plate 10 less the voltage appearing on detector plate 12. This output is taken from the junction of logarithmic device 98 and resistance 96 is coupled directly to the control grid of vacuum tube 100 which may be one section of a type 6SU7 twin-triode vacuum tube.

The foregoing detailed description covers only that which is contained in one channel 48 of the electronic circuitry shown in the schematic diagram of FIGURE 3. Detector plate 14 and common detector plate 12 are coupled to identical channel 50 which contains voltage amplifiers 26 and 28, difference circuit 32, power amplifier 36 and logarithmic network 40 of FIGURE 2. The output of channel 50 is coupled directly to the control grid of vacuum tube 102 which may be the other section of a type 6SU7 twin-triode vacuum tube. The cathodes of vacuum tubes 100 and 102 are connected together and coupled to ground through a resistance 103 which may have a value of 100K ohms, and the anodes of vacuum tubes 100 and 102 may be coupled to +B through resistance 104 and 105, respectively, which may have a value of 50K ohms. Vacuum tubes 100 and 102 and resistances 103, 104 and 105 comprise difference circuit 42 as shown in FIGURE 2, and perform the function as required by Equation 4. The signal appearing at the control grid of vacuum tube 100 represents the logarithm of the difference in potential between detector plates 10 and 12 and the signal at the control grid of vacuum tube 102 represent the logarithm of the difference in potential between detector plates 12 and 14, or in other words, the logarithm of the values expressed by Equations 2 and 3, respectively. In order to eliminate the unknown quantities of charge on the electrostatically charged body Q, and dielectric constant, e, of Equations 2 and 3, it is necessary to divide one of these equations by the other. This is accomplished by subtracting the logarithms e of the values expressed by Equations 2 and 3 in the difference circuit 42 of FIGURE 2 which is comprised of vacuum tubes 100 and 102 and their associated components in FIGURE 3.

The anode of vacuum tube 100 is coupled through coupling capacitor 106, which may have a value of 1.0 microfarad, and through diode 107 to the control grid of amplifier vacuum tube 112 which may be one section of a type 5965 twin-triode vacuum tube. Similarly, the anode of vacuum tube 102 is coupled through coupling capacitor 108 and diode 110 to the control grid of amplifier vacuum tube 112.

The cathode of vacuum tube 112 is coupled to ground through a resistance 114 in parallel with a bypass condenser 116. Resistance 114 may have a value of 350 ohms and capacitance 116 may have a value of 50 microfarads. The control grid of vacuum tube 112 may be coupled to the arm of a range control potentiometer 118 through a grid resistance 120, which may have a value of 1 megohm. One terminal of range control potentiometer 118 may be connected to ground and the opposite terminal may be connected to the negative terminal of a battery 122, the positive terminal of which is connected to ground. The range control potentiometer may have a resistance value of 1 megohm and battery 122 may have a rating of 6 volts. The anode of vacuum tube 112 is coupled to +B through the excitation coil of a current relay 46 so that when current flows through vacuum tube 112 the excitation coil of relay 46 will cause relay contacts 124 and 126 to make electrical contact with each other.

When an electrostatically charged body approaches detector plates 10, 12 and 14 a voltage is induced on each of detector plates 10, 12 and 14 in accordance with Equation 1. Each of these voltages is amplified and introduced into a difference circuit which takes the difference of the amplified voltages appearing on detector plates 10 and 12 and the difference of the amplified voltages appearing on detector plates 12 and 14 in accordance with Equations 2 and 3. These difference signals are then amplified and introduced into logarithmic networks 38 and 40, the output of which is coupled to difference circuit 42 which produces an output signal in accordance with Equation 7. Adjustment of range control potentiometer 118 will vary the bias on the voltage amplifier 44 and will thus vary the operating threshold of the system so that the preselected scoring range of an electrostatically charged body may be varied.

The embodiment of the invention has been described as having three electrically conductive detector electrodes or plates and associated electric circuitry to detect and indicate the presence of an electrostatically charged body. The arrangement of the detector plates in the embodiment described will detect the presence of a charged body that lies on or near the axis normal to the surfaces of the detector plates. In order to detect the presence of an electrostatically charged body on an axis parallel to the surfaces of the detector plates it will be necessary to employ additional arrays of detector plates and associated electronic circuitry of the type described in the embodiment of this invention.

It is to be understood that various modifications may obviously be made without departing from the spirit and scope of the invention, as hereinafter defined by the appended claims, as only a preferred embodiment of the invention has been described.

What is claimed is:

1. Apparatus for detecting the proximity of an electrostatically charged body comprising: a plurality of detector electrodes positioned in spaced relationship with a common detector electrode and adapted to receive electrostatic charges from the electrostatically charged body, said charge being inversely proportional in magnitude to the distance between said charged body and each of said electrodes, and electric circuit means coupled to said detector electrodes and to said common detector electrode for sensing the charge potentials developed between said common detector electrode and each of said detector electrodes and for dividing one of said charge potentials by the other of said potentials to develop an output signal related to the distance between said detector electrodes and said electrostatically charged body.

2. Apparatus for detecting the proximity of an electrostatically charged body irrespective of the magnitude of charge carried by said body comprising: a plurality of dector electrodes positioned in spaced relationship with a common electrode and adapted to receive electrostatic charges from the electrostatically charged body, electrical difference circuit means coupled to said detector electrodes and to said common detector electrode for developing a pair of signals indicative of the differences in charge potentials between said common detector electrode and each of said detector electrodes, and electrical division circuit means coupled to said electrical difference circuit means for dividing one of said pair of signals by the other one of said pair of signals to obtain a resultant signal indicative of the distance between said detector electrodes and said electrostatically charged body.

3. Apparatus for detecting the proximity of an electrostatically charged body comprising: a pair of detector elements positioned in spaced relationship with a common detector element, first electrical difference circuit means coupled to said common detector element and to one of said pair of detector elements for developing a signal indicative of the difference of the charges between said common detector element and said one of said pair of detector elements, second electrical difference circuit means coupled to said common detector element and to the other one of said pair of detector elements for developing a signal indicative of the difference in charges between said common detector element and said other one of said pair of detector elements, and electrical division circuit means coupled to the outputs of said first and said second electrical difference circuit means for dividing the signal appearing at one of said outputs by the signal appearing at the other one of said outputs to obtain a resultant signal that is dependent upon the distance between one of said pair of detector elements and the electrically charged body and independent of the magnitude of electrostatic charge on the electrostatically charged body.

4. Apparatus for detecting the proximity of an electrostatically charged body comprising: a pair of detector elements positioned in spaced relationship with a common detector element, first electrical difference circuitry means coupled to said common detector element and to one of said pair of detector elements for developing a signal indicative of the difference of charges between said common detector element and said one of said pair of detector elements, second electrical difference circuit means coupled to said common detector element and to the other one of said pair of detector elements for developing a signal indicative of the difference in charges between said common detector element and said other one of said pair of detector elements, electrical dividing circuit means coupled to the outputs of said first and said second electrical difference circuit means for dividing the signal appearing at one of said outputs by the signal appearing at the other one of said output, and indicating means associated with said electrical dividing circuit means for developing an output signal indicative of the proximity of the electrostatically charged body and independent of the magnitude of electrostatic charge on said electrostatically charged body.

5. Detection apparatus for indicating the proximity of an electrostatically charged body comprising: at least three substantially parallel and substantially equally spaced electrically conductive detector elements, electrical amplifying circuit means coupled to each said detector element to produce output signals proportional to the magnitude of electrostatic charge induced on each of said detector elements by the electrostatically charged body, first electrical difference circuit means coupled to said electrical amplifying circuit means for developing a pair of difference signals proportional to the difference between the magnitude of charge on the center one of said three detector elements and each of the outer ones of said three detector elements, electrical logarithmic circuit means coupled to said first electrical difference circuit means for producing a pair of logarithmic signals proportional to the logarithms of said pair of difference signals, and second electrical difference circuit means coupled to said electrical logarithmic circuitry for developing an output signal proportional to the difference between said pair of logarithmic signals and indicative of the distance between said detector elements and said electrostatically charged body.

6. Detection apparatus for indicating the proximity of an electrostatically charged body comprising: at least three substantially parallel and substantially equally spaced electrically conductive detector elements, electrical amplifying circuit means coupled to each said detector element for producing output signals indicative of the magnitude of electrostatic charge induced on each of said detector elements by the electrostatically charged body, first electrical difference circuit means coupled to said electrical amplifying circuit means for producing a pair of difference signals proportional to the difference between the magnitude of charge on the center one of said three detector elements and each of the outer ones of said three detector elements, electrical logarithmic circuit means coupled to said first electrical difference circuit means for producing a pair of logarithmic signals proportional to the logarithms of said pair of difference signals, second electrical difference circuit means coupled to said electrical logarithmic circuit means for producing an output signal porportional to the difference between said pair of logarithmic signals, and indicating means coupled to said second electrical difference circuit means adapted to indicate proximity of an electrostatically charged body.

7. Apparatus for detecting the proximity of an electrostatically charged body irrespective of the magnitude of electrostatic charge carried by said body comprising: at least three detector elements positioned substantially parallel to each other and each capable of receiving an induced electrostatic charge from a proximate electrostatically charged body, first electrical difference circuit means coupled to the center element of said three detector elements and to one outer element of said three detector elements for developing a first difference signal indicative of the charge potential produced between said center element and said one outer element of said three detector elements, second electrical difference circuit means coupled to said center element of said three detector elements and to the other outer element of said three detector elements for developing a second difference signal indicative of the charge potential produced between said center element and said other outer element of said three detector elements, first logarithmic circuit means coupled to said first electrical difference circuit means for developing a first logarithmic signal proportional to the logarithm of said first difference signal, second logarithmic circuit means coupled to said second electrical difference circuit means for developing a second logarithmic signal proportional to the logarithm of said second difference signal, and third electrical difference circuit means coupled to said first and to second logarithmic circuit means for developing a third difference signal proportional to the difference between said first and said second logarithmic signals and related to the distance between said electrostatically charged body and said three detector elements.

8. Apparatus for detecting the proximity of an electrostatically charged body irrespective of the magnitude of electrostatic charge carried by said body comprising: at least three detector elements positioned substantially parallel to each other and each capable of receiving an induced electrostatic charge from a proximate electrostatically charged body, first electrical difference circuit means coupled to the center element of said three detector elements and to one outer element of said three detector elements for developing a first difference signal indicative of the charge potential produced between said center element and said one outer element of said three detector elements, second electrical difference circuit means coupled to said center element of said three detector elements and to the other outer element of said three detector elements for developing a second difference signal indicative of the charge potential produced between said center element and said other outer element of said three detector elements, first logarithmic circuit means coupled to said first electrical difference circuit means for developing a first logarithmic signal proportional to the logarithm of said first difference signal, second logarithmic circuit means coupled to said second electrical difference circuit means for developing a second logarithmic signal proportional to the logarithm of said second difference signal, third electrical difference circuit means coupled to said first and to second logarithmic circuit means for developing a third difference signal proportional to the difference between said first and said second logarithmic signals and indicating means coupled to said third electrical difference circuit means for producing an output signal indicative of the distance between said electrostatically charged body and said three detector elements.

References Cited by the Examiner

UNITED STATES PATENTS 2,505,042  4/1950  Gourdan.
2,769,098  10/1956  Dunham.
2,993,165  7/1961  Jauch _____ 324—32

NEIL C. READ, *Primary Examiner.*

FREDERICK M. STRADER, *Examiner.*